United States Patent [19]

Torikoshi et al.

[11] Patent Number: 4,764,784
[45] Date of Patent: Aug. 16, 1988

[54] CAMERA WITH A BUILT-IN ZOOM LENS

[75] Inventors: Yuichi Torikoshi, Kanagawa; Hitoshi Shirai, Sagamihara; Kazuyuki Iwasa, Mitaka; Hiroaki Miyazaki, Kanagawa; Yasuo Yamazaki, Hino, all of Japan

[73] Assignee: Olympus Optical Company, Ltd., Tokyo, Japan

[21] Appl. No.: 115,250

[22] Filed: Oct. 30, 1987

[30] Foreign Application Priority Data

Nov. 21, 1986 [JP] Japan .................................. 61-279242
Dec. 3, 1986 [JP] Japan .................................. 61-288122

[51] Int. Cl.$^4$ .............................. G02B 7/10; G03B 3/00
[52] U.S. Cl. ................................. 354/195.12; 350/429; 350/430
[58] Field of Search .................... 354/195.1, 195.12; 350/429, 430, 255

[56] References Cited

U.S. PATENT DOCUMENTS 3,533,344 10/1970 Thomas ............................... 350/430
3,631,786 1/1972 Crapsey ............................ 354/195.1
4,168,884 9/1979 Tesch .................................. 350/430
4,318,593 3/1982 Tsuji et al. ........................ 350/430
4,536,068 8/1985 Kodaira ........................... 354/195.12

FOREIGN PATENT DOCUMENTS 59-191021 10/1984 Japan.

Primary Examiner—A. A. Mathews
Attorney, Agent, or Firm—Louis Weinstein

[57] ABSTRACT

A camera with a built-in zoom lens includes at least first and second lens groups, a zoom frame for moving these lens groups along their optical axis during a zooming operation, a first lens holding frame carrying the first lens group and movable together with the zoom frame, a second lens holding frame carrying the second lens group and movable together with the zoom frame, a rocking arm disposed between the zoom frame and the second lens holding frame, rockingly supported on a camera body and having a first abutment which bears against the zoom frame and a second abutment which bears against the second lens holding frame, and a resilient biasing element for urging the second lens holding frame towards the zoom frame side; in addition to the above biasing element is lock number for locking the second lens holding frame during a macro operation.

16 Claims, 10 Drawing Sheets

CAMERA WITH A BUILT-IN ZOOM LENS

BACKGROUND OF THE INVENTION

The present invention relates to a camera with a built-in zoom lens, and more particularly, to a camera provided with a drive mechanism for a zoom lens built-in a compact camera or the like.

Conventional cameras with a zoom lens are generally of the lens interchangeable system and a zooming mechanism for an interchangeable lens of the system has been disclosed, for example, in Japanese Laid-Open Patent Application No. Sho 54/1979-771312. As a lens shutter camera, an AF lens drive mechanism in a fully automatic camera which employs a lens shutter has been disclosed in Japanese Laid-Open Patent Applications Nos. Sho 56/1981-52709 and Sho 60/1985-93409. However, this lens drive mechanism is not for a zoom lens but for a lens system which is supported on a single frame body to which a guide shaft is secured.

Furthermore, a technique for incorporating a macro photographing mechanism in a camera with a built-in zoom lens as described above so as to enable a macro photography is not yet proposed. As such a camera enabling a macro photography, an interchangeable zoom lens provided with a macro photographying mechanism has been disclosed, for example, in Japanese Laid-Open Patent Application No. Sho 52/1977-45330 and an apparatus for moving an optical system in a variable focus camera has been disclosed in Japanese Laid-Open Patent Applications Nos. Sho 59/1984-191021 and Sho 59/1984-177523 (U.S. Pat. No. 4,536,068).

In a zooming mechanism and a macro photographing mechanism of an interchangeable lens which employ a cam barrel which is generally used in an interchangeable lens, there are problems of necessitating a highly accurate cam and hence increasing its manufacturing cost. In addition, when a shutter lens is employed, a space and a configuration of the cam barrel are restricted since a shutter mechanism is disposed within the cam barrel.

In addition, although it is conceivable to drive each of the lens groups in a zoom lens system by a cam mechanism, this disadvantageously complicates the mechanism. In a macro photographing mechanism, although it is conceivable that the number of steps of a focus adjusting cam in a lens shutter mechanism increases to a macro photographing region, a full movement of front elements in a lens group is technically limited, so that it is disadvantageously impossible to make a magnification of a picture in a macro photography larger.

SUMMARY OF THE INVENTION

It is an object of the present invention to provide a camera with a built-in zoom lens adapted to a compact camera, including at least first and second lens groups and a lens drive device which easily drives the first and second lens groups with a rocking arm of a simple structure in a zooming operation.

It is another object of the present invention to provide a camera with a built-in zoom lens comprising a zoom drive mechanism and a macro photographing mechanism for each lens group in a zoom lens system with an extremely simple structure covering the entire region from a wide angle to an acute angle for telephotography.

In the present invention, a camera with a built-in zoom lens including at least first and second lens groups and a lens drive device for zooming the first and second lens groups by moving them back and forth in a direction of their optical axis, is characterized by a zoom frame 1 which moves back and forth in a direction of the optical axis by a zooming operation, a first lens holding frame 2 which moves integrally with the zoom frame 1 to move the first lens group back and forth in a direction of the optical axis, a second lens holding frame 3 for holding the second lens group, a rocking arm 4 having a first abutment 4a bearing against the zoom frame 1 and a second abutment 4b bearing against the second lens holding frame 3 and rockingly supported relative to a stationary member for retaining a space between the first and second lens groups, a resilient member 5 for urging the second lens holding frame 3 through the rocking arm 4 to the zoom frame, abutting adjusting means for a focusing cam member 6 and for bearing the second lens holding frame 3 against the second abutment 4b of the rocking arm 4, and inclination adjusting means for adjusting an inclination of the first and the second lens holding frames 2, 3 relative to a guide shaft 7 which slidably supports them.

According to the present invention, each lens group of a zone lens system is allowed to move in a zooming operation while a space is retained between the lens groups in the zoom lens system with a cam arm of a simple configuration, so that the structure can be simplified and minimized, thus providing a lens drive device suitable for a camera with a built-in zoom lens as a compact camera.

Further, in the present invention, a camera with a built-in zoom lens including at least first and second lens groups for allowing these groups to move back and forth in a direction of the optical axis thereof, is characterized by a zoom frame 1 which is movable in the optical axis direction by a zooming operation, a first lens holding frame 2 movable together with the zoom frame for holding the first lens group, a second lens holding frame 3 movable in the optical axis direction for holding the second lens group, a rocking arm 4 disposed between the zoom frame and the second lens holding frame, rockingly supported relative to a camera body and having a first abutment which abuts against the zoom frame and a second abutment which abuts against the second holding frame, urging means for urging the second lens holding frame 3 to the zoom frame 1, and lock means for locking the second lens holding frame 3 during a macro operation.

Accordingly, it is possible to move out the first lens group more than its movement in a focusing operation and to easily increase a magnification of a picture in a macro photograpy. In addition, the structure can be simplified and reduced in size.

Unlike a camera with a macro photographing mechanism in which a conventional interchangeable lens is employed, in a camera with a built-in zoom lens according to the present invention, it is possible to minimize its macro photographing mechanism, so that its freedom of space and configuration increases and a shutter and an automatic focusing mechanism can be easily designed. In addition, since a focus adjusting cam is set on a close range side during a macro operation, it is possible to reduce a forward movement of the zoom frame.

DESCRIPTION OF THE PREFERRED EMBODIMENTS

Figure 1:
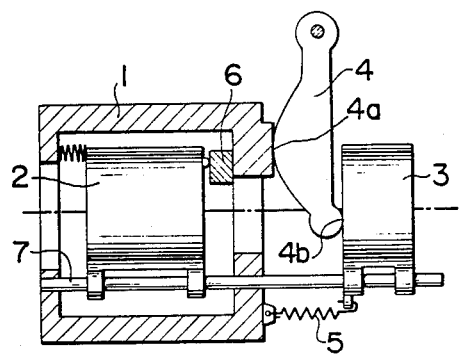
FIG. 1 is a schematic diagram of the present invention.
Figure 2:
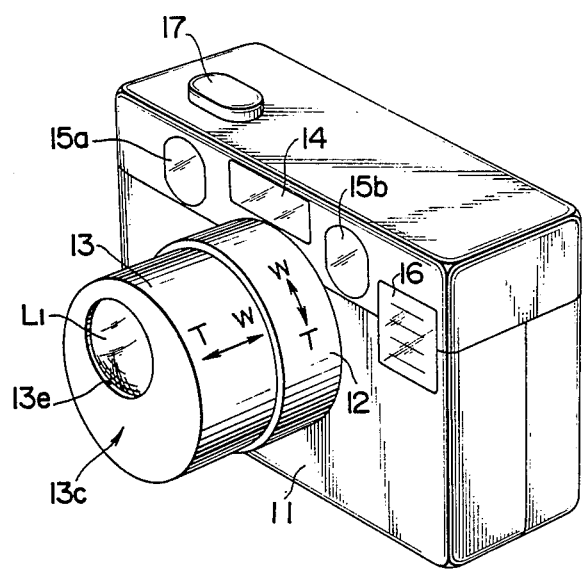
FIG. 2 is a perspective view illustrating an example of a camera with a built-in zoom lens according to the present invention.

In FIG. 2, a lens barrel centrally disposed in a front surface of a camera body 11, which is a zoom frame 13 holding a taken lens optical system including zoom lens groups, is connected through a helicoid screw 13a (see FIG. 5) to a zoom ring 12 so as to rectilinearly move in a direction of the optical axis with a well known mechanism (not shown) such as a cam groove and a fitting pin for rectilinear movement, by rotating the zoom ring 12. The camera body 11 is provided with a finder window 14, windows 15a, 15b for measuring AF ranges, a flash unit window 16 for emitting flash light and a shutter release button 17.

Figure 3:
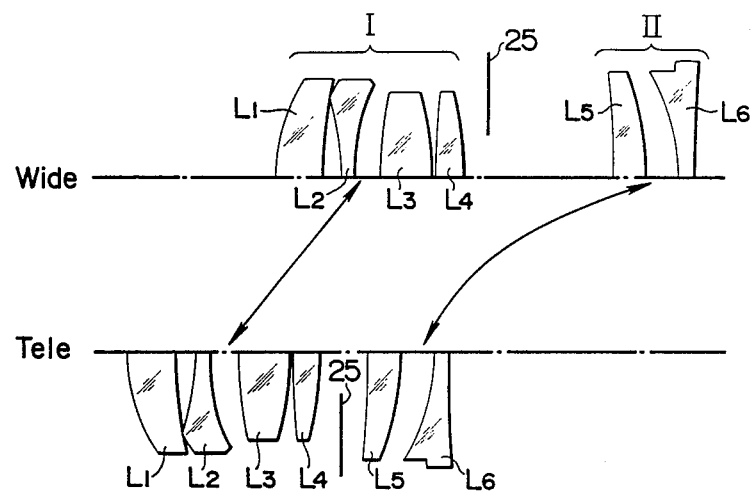
FIG. 3 is an operational diagram illustrating an example of a zoom lens optical system composed of two lens groups.
Figure 5:
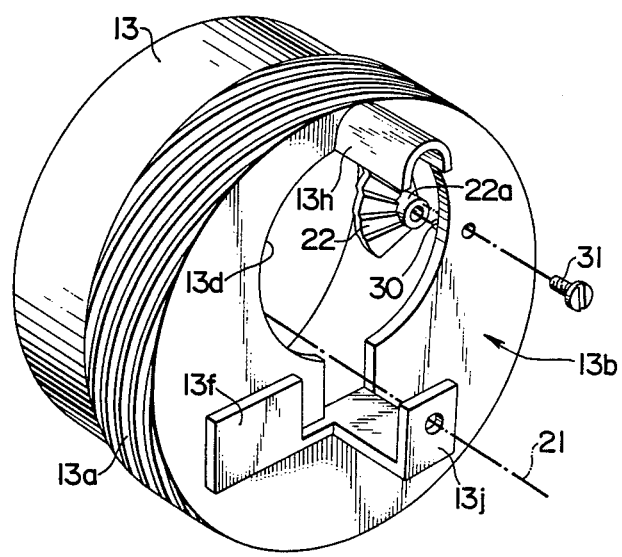
FIGS. 4 and 5 are perspective views of a lens drive device in a first embodiment of a camera with a built-in zoom lens according to the present invention.
Figure 4:
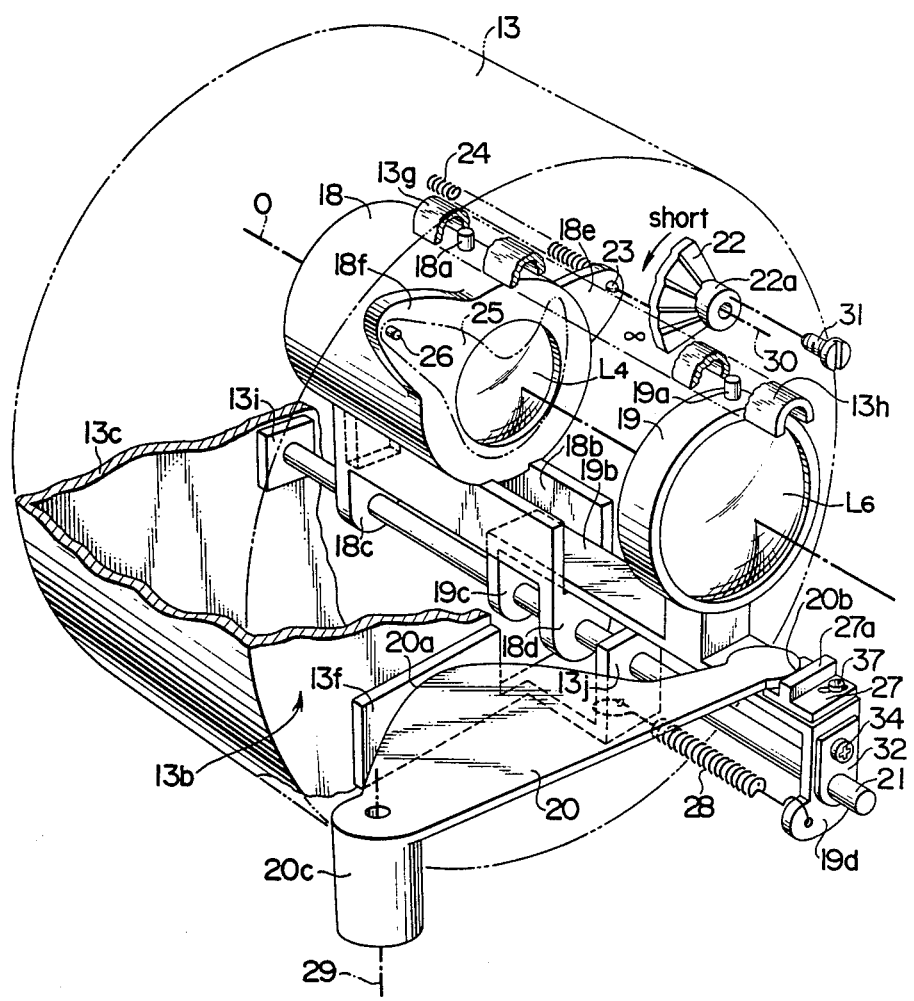

FIGS. 3 to 5 shows a first embodiment of the present invention. A zoom lens optical system in the embodiment, as shown in FIG. 3, is composed of two lens systems: a front lens group I of lenses L1 through L4 and a rear lens group II of lenses L5 and L6, and they are driven in directions shown by arrows in FIG. 3 when a picture is taken by changing from a wide angle photography to a telephotography and vice versa. A focusing operation is performed by moving out the front lens group I by a given amount in any zooming range and correction in movement of focal planes by the zooming operation is performed by minutely adjusting a space between the front and the rear lens groups I, II.

In FIGS. 4 and 5, which show a zoom lens drive device for driving the zoom lenses, the front and the rear lens groups I, II are held in a first lens holding frame 18 within the zoom frame 13 and a second lens holding frame 19 located on the camera body side, by well known holding means, respectively.

The first and the second lens holding frames 18, 19 are movable back and forth along the lens optical axis 0.

FIGS. 4 and 5 shows the zoom frame 13 viewing from the back, that is, the camera body side and hence the front surface of the lens barrel is diagonally to the upper left.

The zoom frame 13 has its rear and front walls 13b, 13c (see FIG. 2) on which openings 13d, 13e facing the respective lens groups I, II are provided. In addition, the zoom frame 13 includes an abutting surface 13f on the outer surface of the rear wall 13b against which a first abutment plane 20a (hereinafter referred to as first cam plane) of a rocking arm 20 (hereinafter referred to as a cam arm) bears and guide grooves 13g, 13h of the reverse U-shaped configuration which guide guide pins 18a, 19a provided on the respective upper surfaces of the first and the second holding frames 18, 19, on the upper part of the zoom frame 13. Furthermore, a guide shaft 21 which slidably supports the first and the second holding frames 18, 19 in a direction of the optical axis below these holding frames 18, 19 in a direction of the optical axis below these holding frames 18, 19 is secured to the zoom frame 13 by its fixing portions 13i, 13j.

The first lens holding frame 18 is integrally provided with a fitting groove 18b of a channel-shaped configuration having no bottom wall at the lower part of the frame 18.

On both front and rear ends of the fitting groove 18b are formed holding members 18c, 18d which closely and slidably fit on the guide shaft 21 in a suspended manner. In addition, the first holding frame 18 has first and second projection arms 18e, 18f extending respectively diagonally to the upper left and upper right toward the rear part on the upper part of the frame 18. On the first projection arm 18e is provided a projection 23 which abuts against a focusing cam 22 which is a cam member for focusing and is pivotally supported on the zoom frame 13. The first holding frame 18 is urged in a direction where is bears against the focusing cam 22 by urging the first projection arm 18e by a first holding frame urging spring 24 made of a compression coil interposed between the first projection arm 18e and the front wall 13c of the zoom frame 13. Accordingly, the first lens holding frame 18, after it has been focused by the focusing cam 22, moves back and forth integrally with the zoom frame 13 in the optical axis direction. On the second projection arm 18f is provided a support pin 26 for a diaphragm and shutter blade 25 of the vario-type shutter composed of two sector blades.

The second lens holding frame 19 is integrally provided with a support plate 19b extending in both front and rear directions of the optical axis through a short square-shaped pillar extending downwardly of the lower part of the frame 19. The front part of the plate 19b is fitted into the fitting groove 18b. On the front end of the plate 19b is formed a holding member 19c which closely fits on the guide shaft 21, in a suspend manner. A holding member 19d formed on the rear end of the plate 19b also closely and slidably fits on the guide shaft 21. To the upper surface of the rear end of the plate 19b is secured an abutting plate 27 for adjusting an abutting position of a second abutment 20b (hereinafter referred to a second cam surface) of the cam arm 20. A compression type coiled spring 28 is disposed between the fixing portion 13j of the zoom frame 13 and the holding member 19d so that the front surface of a projected strip 27a of the abutting plate 27 firmly abuts against the second cam surface 20b of the cam arm 20.

The cam arm 20 has its base tube portion 20c rockingly mounted on a support shaft 29 which is mounted on a stationary member located toward the camera body. The cam arm 20 has a first cam surface 20a which expands forwardly from the middle part of a free end portion of the cam arm 20 and which bears against an abutment 13f of the zoom frame 13, and the second cam surface 20b of a disk shape formed on the front end portion of the arm 20 which bears against the abutting plate 27.

The focusing cam 22 is formed by an end surface cam of a fan shape and is disposed by rotatably mounting a boss 22a of a short tube-like configuration at the base thereof on a shaft 30 (FIG. 5) provided on the rear wall 13b of the zoom frame 13. The cam 22 rotates in a direction shown by an arrow by a member (not shown) to perform a zone focusing operation from a close range position to infinity by moving the projection 23. Furthermore, the focusing cam 22 is made such that part of the end surface of its boss 22a is pushed in the optical axis direction by an adjusting screw 31 (see FIG. 5) which is threadably mounted on the rear wall 13b, whereby a space between the front and the rear lens groups I, II can be minutely adjusted.

Figure 6:
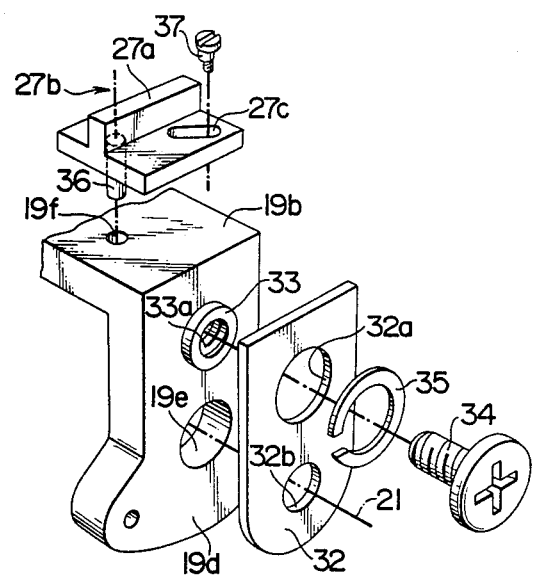
FIG. 6 is a disassembled perspective view on an abutment adjusting mechanism for an inclination adjusting mechanism and a second cam surface of a cam arm in the lens drive device shown in FIG. 5.

FIG. 6 is a disasembled perspective view of adjusting means for adjusting an inclination of the holding frames 18, 19 relative to the guide shaft 21. A guide shaft inserting hole 19e provided on the holding member 19d is a through-hole of a larger diameter than that of the guide shaft 21 and a circular boss 33 for fixing an adjusting plate 32 is projectingly provided on the holding member 19d above the hole 19e. The boss 33 is provided with a screw hole 33a into which a fixing screw 34 is threadably engaged, at the central part of the boss 33. The adjusting plate 32 is formed by a generally rectangular plate whose lower part is semicircular in shape and has a hole 32a whose inner diameter is larger than that of the boss 33 and in which the outer periphery of the a boss 33 is fitted, and the hole 32b for supporting the guide shaft below the hole 32a. After the plate 32 is mounted by fitting the hole 32a onto the boss 33 and the hole 19e is aligned with the supporting hole 32b, a spring washer 35 is fitted around the boss 33 and the fixing screw 34 is screwed into the hole 33a. Then, the adjusting plate 32 is urged to the holding member 19d through the washer 35 by the flat head of the screw 34 and thus the plate 32 is secured to the holding member 19d in a unitary manner.

The adjusting plate 32 mounted as described above is fixed under a friction caused by pressing the washer 35, so that it is possible to movably adjust with a definite force. Accordingly, by shifting the hole 32b supporting the guide shaft 21 in a direction perpendicular to the optical axis 0, the second holding frame 19 can be adjusted in inclination relative to the guide shaft 21.

In addition, adjusting means of a structure similar to the inclination adjusting means shown in FIG. 6 is provided between the holding member 18c of the first holding frame 18 and the guide shaft 21 as well as between the guide shaft fixing portion 13i and the guide shaft 21, so that it is possible to easily adjust an inclination of the first holding frame 18 relative to the guide shaft 21 and an inclination of the whole lens system relative to a film surface by adjusting the guide shaft fixing portion 13i.

Figure 7:
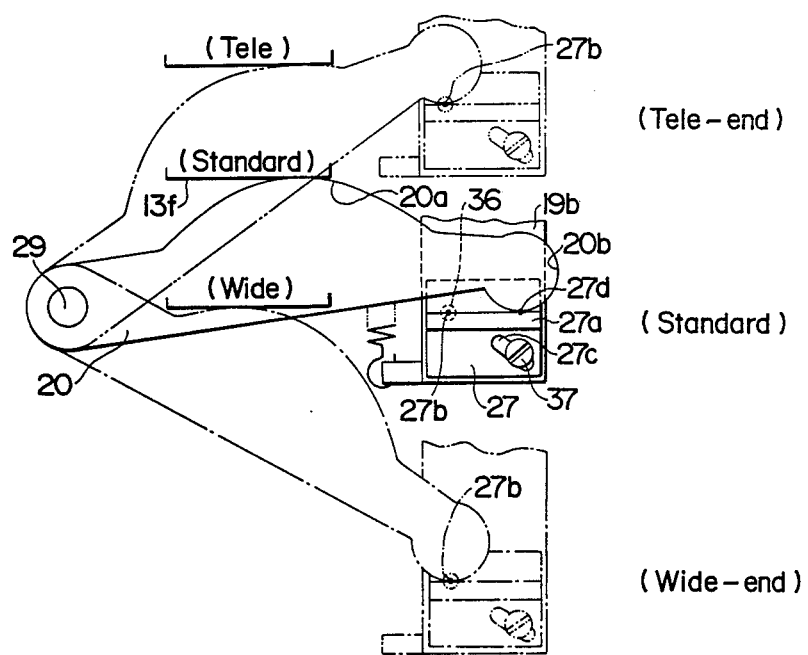
FIG. 7 is a plan view illustrating operations of the abutment adjusting mechanism.

FIG. 7 shows an abutment adjusting means for the second holding frame 19 to the second cam surface 20b of the cam arm 20. While correction in movement of a focal plane by a zooming operation is conventionally achieved by minutely adjusting a space between the front and the rear lens groups I, II, in the present invention the adjusting screw 31 (see FIGS. 4 and 5) is rotated for adjustment to move the focusing cam 22 in the optical axis direction in order to allow the focal planes at a long focus position (hereinafter referred to as a tele-end) and a short focus position (hereinafter referred to as a wide-end) to be in agreement with each other. Since the first holding frame (the front lens group I) 18 abuts against the focusing can 22, it is possible that the space between the front and the rear lens groups I, II varies to allow the focal planes at the tele-end and the wide-end to be in agreement with each other.

In the present invention, as shown in FIG. 7, the abutting point 27b on the projecting strip 27a of the abutting plate 27 and the second cam surface 20b of the cam arm 20 are so constructed that they are in agreement with each other at the tele-and the wide-ends. Specifically, as shown in FIG. 6, the abutting plate 27 is provided with a suspended pin 36 fixed on the back of the abutting plate 27 to form a rotatable supporting point at a position directly below the abutting point 27b. The pin 36 is inserted and half-caulked in a fitting hole 19f provided on the rear end portion of the supporting plate 19b of the second holding frame 19. Accordingly, since the abutting point 27b is formed on the rotatable supportng point of the abutting plate 27, the abutting points 27b at the tele-and the wide-ends against the second cam surface 20b are made in agreement with each other.

A focal plane in the standard zone deviates from the focal plane at the tele-and the wide-ends unless accuracy of the first and the second cam surfaces 20a, 20b and accuracy of the lens system are properly established. For this reason, as shown in FIG. 7, the structure of the present invention is such that a position of an abutting point 27d in the standard zone is changeable in the optical axis direction by rotating the abutting position 27b, that is, rotating the abutting plate 27 around the center of the suspended pin 36 with an eccentric pin 37 provided on the rear end portion of the supporting plate 19b which pin is inserted through an elongated slot 27c provided on the abutting plate 27, without changing the position of the abutting point 27b at the tele-and wide-ends. Accordingly, with the above structure, since the distance between the front and the rear lens groups I, II at the tele-and the wide-ends is not changed and only a distance between the front and the rear lens groups in the standard zone is changed, it is possible to allow a focal plane of the standard zone to be in agreement with the focal plane of the tele-and the wide-ends which has been made in agreement with each other.

It is to be noted that this adjustment of the focus in the standard zone can not be achieved with a conventional cam barrel system in an interchangeable lens.

In a zooming operation, the zoom ring 12 is first rotated. Then, the zoom frame 13 moves back and forth by means of the helicoidal screw 13a and a well known rectilinear motion mechanism (not shown) along the optical axis. The first lens holding frame 18, which is in abutment with the focusing cam 22 pivotally supported on the zoom frame 13, moves integrally with the zoom frame 13. The cam arm 20, its first and the second cam surfaces 20a, 20b being urged by the abutting surface 13f of the zoom frame 13 and the abutting plate 27 respectively, rocks around the center of the supporting shaft 29 when the zoom frame 13 moves. The second lens holding frame 19 also moves along the optical axis when the second cam surface 20b of the cam arm 20 rocks. At this time, a distance between the first and the second lens holding frames 18, 19 (the front and the rear lens groups I, II), as shown in FIG. 7, is retained at a given value by the first and the second cam surfaces 20a, 20b of the cam arm 20. During the movement of the first and the second lens holding frames 18, 19, restriction in their direction of movement to the guide shaft 21 is made by slidably moving the guide pins 18a, 19a within the respective guide grooves 13g, 13h.

As such, the zooming operation is effected by moving back and forth the first and the second lens holding frames 18, 19 and hence the front and the rear lens groups I, II as shown in FIG. 3.

A focusing operation will be described hereinafter. The focusing cam 22 is rotated in a direction shown in FIG. 4 with the arrow by a range measuring drive device (not shown). Thereupon, the first lens holding frame 18 is driven out by the cam surface of the focusing cam 22 against the resilience of the spring 24 through the projection 23 to move the front lens group I to bring it into focus.

In addition, a shutter operation is effected by opening and closing the shutter blade 25 shared with a diaphragm by a shutter drive device (not shown).

The range measuring drive device and the shutter drive device as disposed within the zoom frame 13.

Figure 8:
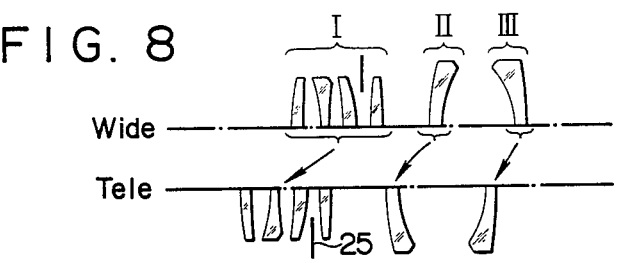
FIG. 8 is an operational diagram illustrating an example of a zoom lens optical system composed of three lens groups.

FIG. 8 shows an example of zoom optical systems consisting of first, second and third lens groups: I, II, III, which move in directions indicated in FIG. 8 when a wide photography is changed to a tele photography and vice versa.

Figure 9:
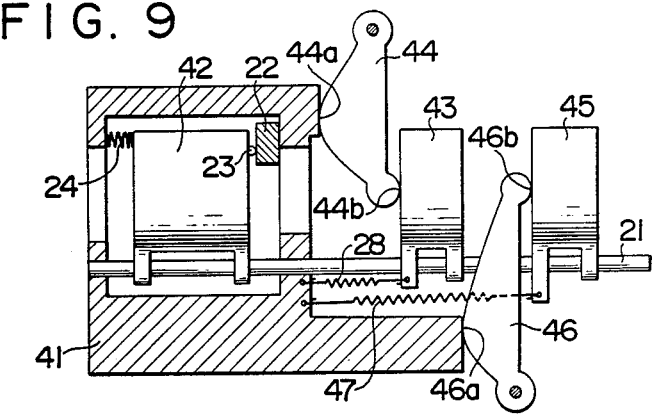
FIG. 9 is a plan view of a lens drive device in a second embodiment of the present invention.
Figure 10:
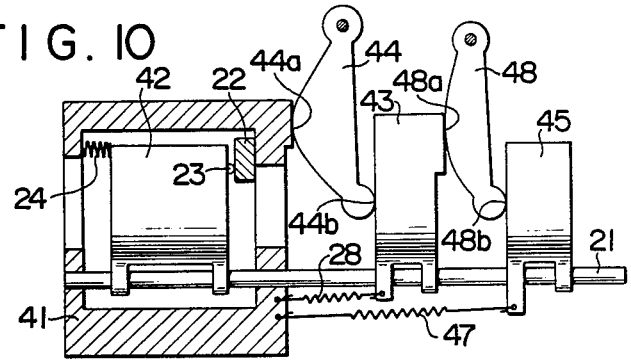
FIG. 10 is a plan view of a lens drive device in a third embodiment of the present invention.
Figure 11:
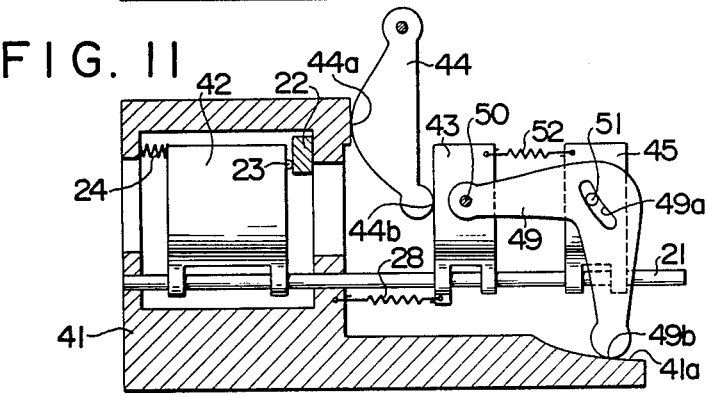
FIG. 11 is a plan view of a lens drive device in a fourth embodiment of the present invention.

FIGS. 9, 10 and 11 show embodiments of the present invention which is applied to a zoom lens consisting of three lens groups.

In FIG. 9, which shows a second embodiment of the present invention, its structure is such that a first lens holding frame 42 holding a first lens group I moves integrally with a zone frame 41 in a manner similar to the first embodiment described above, a distance between the first and the second lens groups I, II is controlled by a first cam 44 having cam surfaces 44a, 44b which respectively bear against the zoom frame 41 and a second lens holding frame 43 for holding the second lens group II, a distance between the second and the third lens groups II,III is controlled by a second cam arm 46 having cam surfaces 46a, 46b which respectively bear against the zoom frame 41 and a third lens holding frame 45 for holding the third lens group, and the third lens holding frame 45 and the zoom frame 41 are connected by a compression coiled spring 47. Other structures are the same as those of the first embodiment.

In FIG. 10, which shows a third embodiment of the present invention, the second and the third lens groups II,III are connected by a second cam arm 48 having cam surfaces 48a, 48b which respectively bear against the second and the third lens holding frames 43, 45. Other structures are the same as those of the second embodiment described above.

In FIG. 11, which shows a fourth embodiment of the present invention, the second and the third lens groups II,III are connected by a rocking arm 49 of a reverse L-shaped configuration which is guided on a cam surface 41a of a zoom frame 41. Specifically, the rocking arm 49 has one end connected to a support stem 50 provided on the second lens holding frame 43 and the other end 49b of a round shape abuts against the cam surface 41a of the zoom frame 41. The rocking arm 49 has also a cam groove slot 49a in the middle part bending downwardly into which a pin 51 provided on the third lens holding frame 45 is fitted. The second and the third lens holding frames 43, 45 are connected by a compression coiled spring 52. Other structures are the same as those of the second and the third embodiments described hereinabove.

With such structures, it is possible to effect desired zooming and focusing operations with first, second and third lens groups.

A zoom lens drive device applied to a macro optical system according to the present invention will be described hereinafter.

In this connection, of the zoom lens drive devices in the foregoing, only the one shown in FIG. 8 is applicable to a tele-macro optical system and others are applicable to the whole zone macro optical system. In the following FIGS. 12 to 19, like parts are given like reference characters and their descriptions will be omitted.

Figure 12:
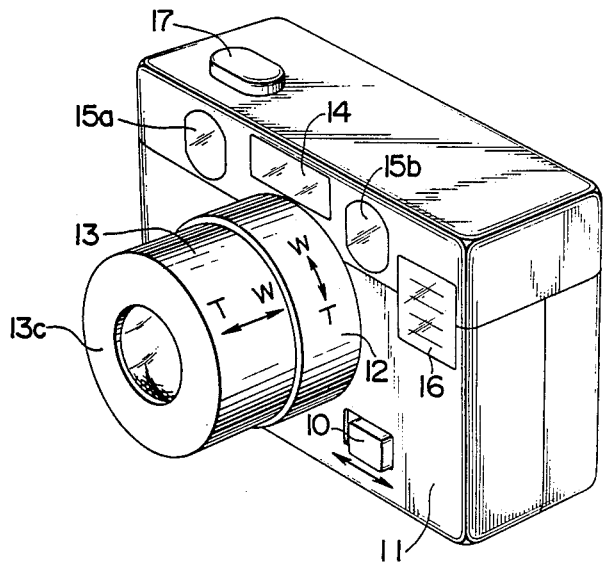
FIG. 12 is a perspective view of a camera with a built-in zoom lens of the preent invention which is applied to a macro system in a zoom lens optical system.

FIG. 12 is a perspective view of a camera with a built-in zoom lens which is applied to a macro optical system according to the present invention. A mode switching button 10 (hereinafter referred to as a macro button) for switching functions of a zoom ring 12 from a zooming operation to a macro photographing operation is provided adjacent to the zoom ring 12 in front of a camera body 11.

Figure 13A:
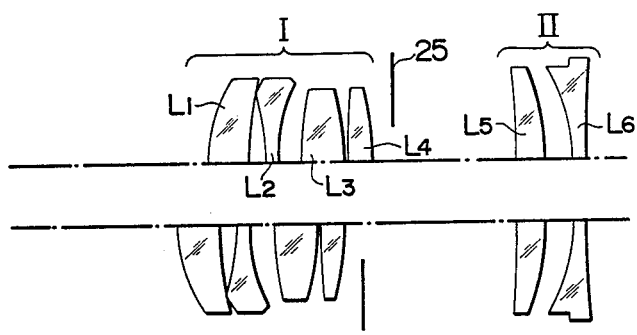
FIGS. 13A and 13B are diagrams illustrating operations of a zoom lens optical system composed of two lens groups during a macro photography operation.
Figure 13B:
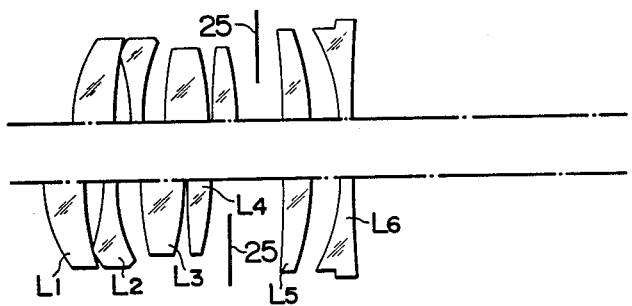

FIGS. 13A and 13B show an example of movement of a zoom optical system and consisting of front and rear lens groups I, II in a macro photography. The front and the rear lens groups I, II move from their respective positions in the upper part of FIG. 13A to their respective positions in the upper part of FIG. 13B by means of a cam mechanism. Furthermore, when respective positions of the lens groups are changed from a zoom zone to a macro zone only the front lens group I is moved without moving the rear lens group II. Namely, respective positions of the front lens group I in the upper parts of FIGS. 13A and 13B are shifted to their respective positions in the lower parts of them. In addition, a focus adjustment can be achieved by moving back and forth the front lens group I by a given amount all over the zooming zone from a wide-to a tele-photography. A diaphragm 25 moves together with the front lens group I.

Figure 14:
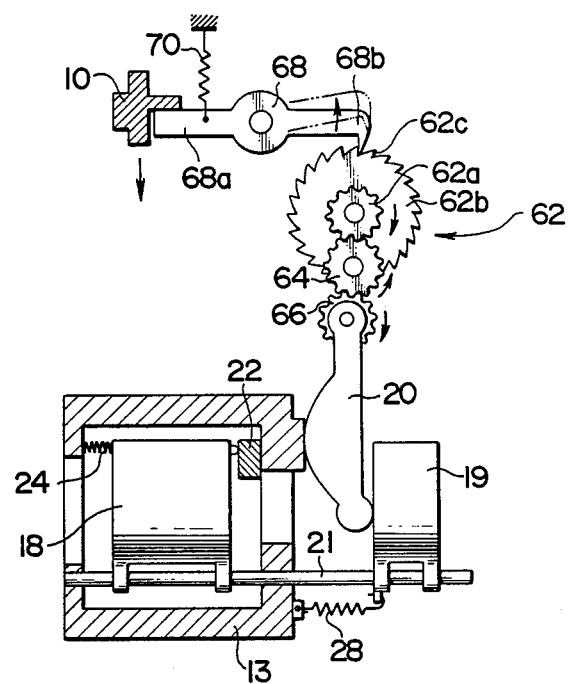
FIG. 14 is a schematic plan view illustrating a fifth embodiment of the present invention which is applied to a macro system.
Figure 15:
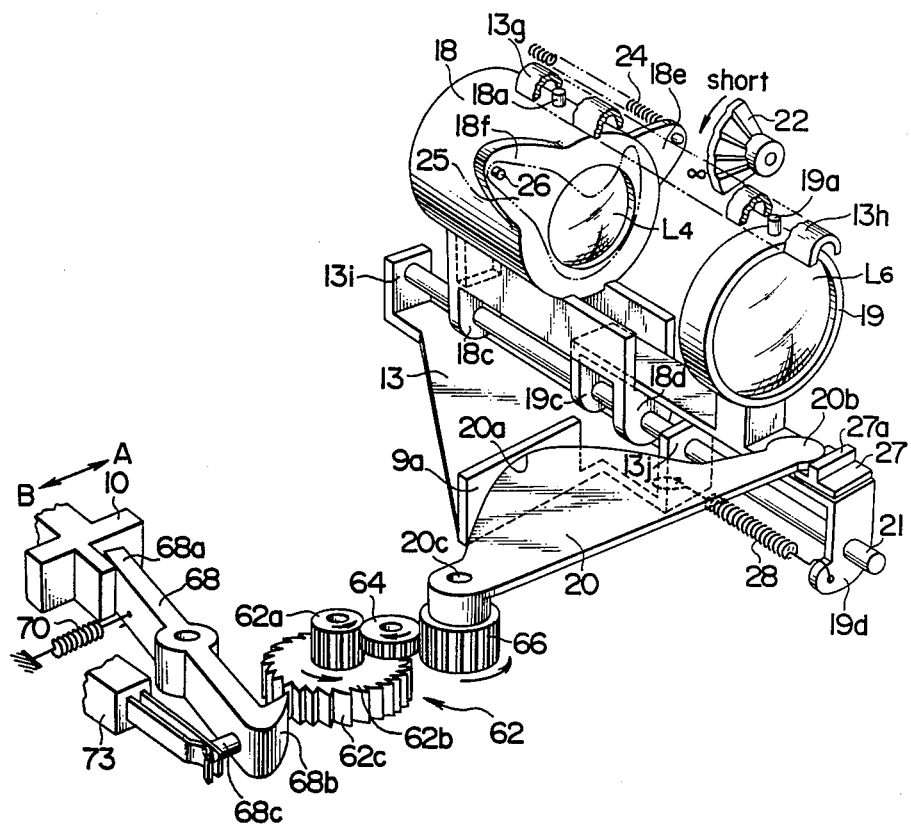
FIG. 15 is a perspective view illustrating a structure of the embodiment shown in FIG. 14 in detail.

FIG. 14 is a schematic diagram of a lens drive device in a fifth embodiment of the present invention which is applied to a macro system. FIG. 15 shows a detailed structure of the lens drive device shown in FIG. 14. In the device, a zooming operation is effected by moving first and second lens holding frames 18, 19 which respectively hold front and rear lens groups I, II, on a guide shaft 21 by a rocking arm 20 which is rockingly mounted on a camera body, along the optical axis. A focus adjustment is effected by means of a cam 22, whose operations are identical to those in the first embodiment described hereinbefore. Therefore, only a macro operation mechanism will be described hereinafter.

In FIG. 14, a detent gear 62 comprises a small diameter gear 62a and a large diameter gear 62b. The gear 62a meshes with a gear 66 provided on the base end of the rocking arm 20 through an intermediate gear 64 and the gear 62b has a plurality of detent grooves 62c of the saw-tooth shaped formed on the outer periphery thereof. During a macro photography, a pawl 68b of a detent lever 68 pivotally fixed to the camera body 11 engages the detent groove 62c. A detent spring 70 is secured between the base end 68a of the detent lever 68 and the camera body 11 so as to urge the front end of the detent lever 68 in a direction towards the detent gear 62b. The macro button 10 is provided in contact with the base end of the detent lever 68 so as to be able to switch modes of a zooming operation and a macro photography. During a macro photography the base end 68a of the detent lever 68 is pulled by the spring 70 such that the pawl 68b engages the detent groove 62c. During a zooming operation the macro button 10 is set to a zooming position A (FIG. 15) to release the engagement between the pawl 68b and the detent groove 62c. A zooming operation and focusing operation thereafter are performed in a manner similar to the foregoing embodiments.

In operation, for a macro photography all over the range from wide to tele, when the macro button 10 is moved from the zooming position A to a macro position B (FIG. 15), the detent lever 68 is rotated counterclockwise in FIG. 15, by the spring 70 so that the pawl 68b abuts against the large diameter gear 62b. Like the zooming operation, when the zoom ring 12 is rotated, the first lens holding frame 18 moves forward. At this time, the rocking arm 20 rotates around the support axle 20c and the detent gear 62 is rotated through the intermediate gear 64. Consequently, the pawl 68b in abutment against the detent gear 62 meshes with the detent groove 62c to prevent further rotation of the gear 62. When the rocking arm 20 stops rotating, the second lens holding frame 19 in abutment with the second cam surface 20b is prevented from further forward movement. When the zoom ring 12 is further continued to rotate, only the first lens holding frame 18 moves forward with the second lens holding frame 19 stopped. Consequently, it is possible to effect a macro photography all over the range from wide to tele. In addition, during a macro photography a microswitch for detecting a macro operation operates to set the focusing cam 22 to the close range side by a control means not shown.

Figure 16:
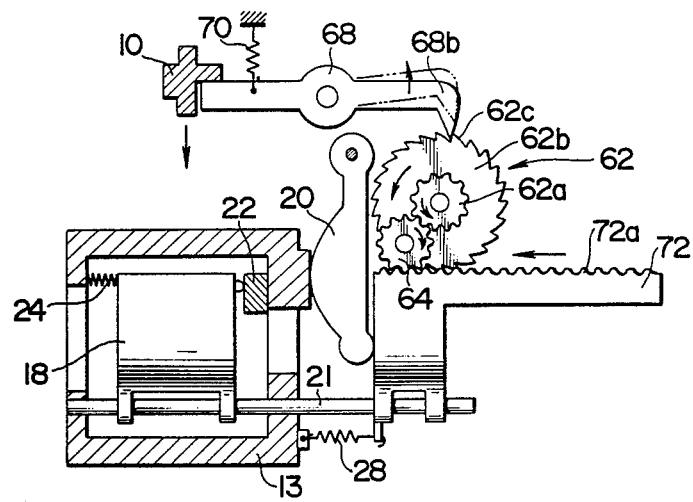
FIG. 16 is a schematic plan view illustrating a sixth embodiment of the present invention which is applied to a macro system.

FIG. 16 shows a sixth embodiment of a camera with a built-in zoom lens according to the present invention, which has a lens drive device provided with a second lens holding frame detent means comprising a detent lever 68, a detent gear 62b, an intermediate gear 64 and a rack gear 72a. A second lens holding frame 72 is directly locked when a macro photography is effected. Specifcally, when the macro button 10 is moved to the macro position, the detent lever 68 is rotated clockwise by the spring 70 to abut the pawl 68b against the detent gear 62b. When the zoom frame 13 moves forward, the second lens holding frame 72 also moves forward. However, since the rack gear 72a formed on the second lens holding frame 72 is in meshing relationship with the detent gear 62 through the intermediate gear 64, when the detent gear 62 is about to rotate with movement of the second lens holding frame 72, the pawl 68b engages the grooves 62c to prevent further rotation thereof. Other mechanisms are identical to those in the foregoing embodiments.

Figure 17:
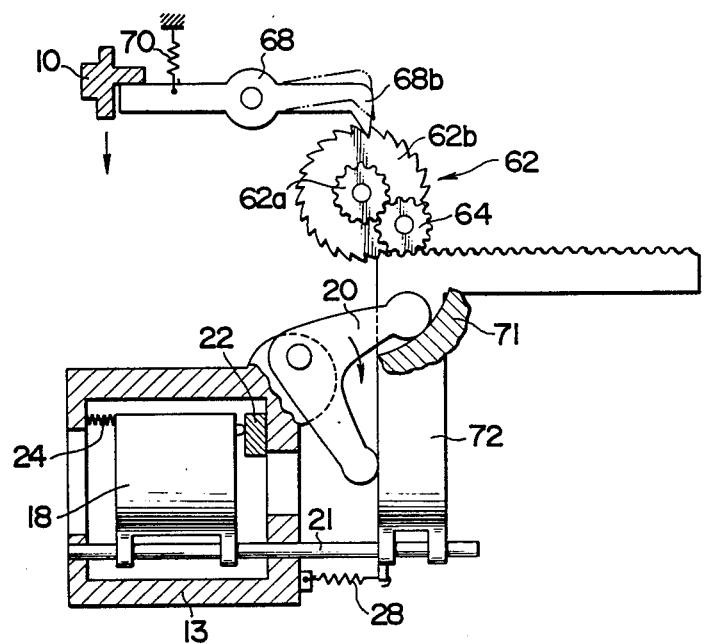
FIG. 17 is a schematic plan view of a seventh embodiment of the present invention which is applied to a macro system.

FIG. 17 shows a seventh embodiment of a camera with a built-in zoom lens according to the present invention, which has a lens drive device including the rocking arm 20 pivotally mounted on the zoom frame 13. The rocking arm 20 has one cam surface in abutment with a camera body cam surface 71 provided on a camera body and the other cam surface in abutment with the front surface of a second lens holding frame 72 such that a distance between front and rear lens groups is variable in response to a zooming operation.

The above-mentioned second lens holding frame lock means which locks the second lens holding frame during a macro photography is provided on the second lens holding frame 72 of the lens drive mechanism. Accordingly, this lens drive device operates in a manner similar to the sixth embodiment.

Figure 18:
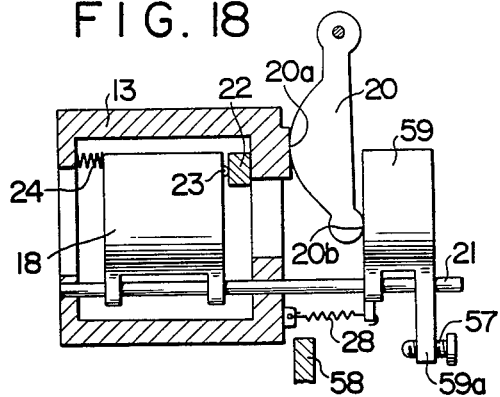
FIG. 18 is a schematic plan view of a eighth embodiment of the present invention which is applied to a tele-macro system.
Figure 19:
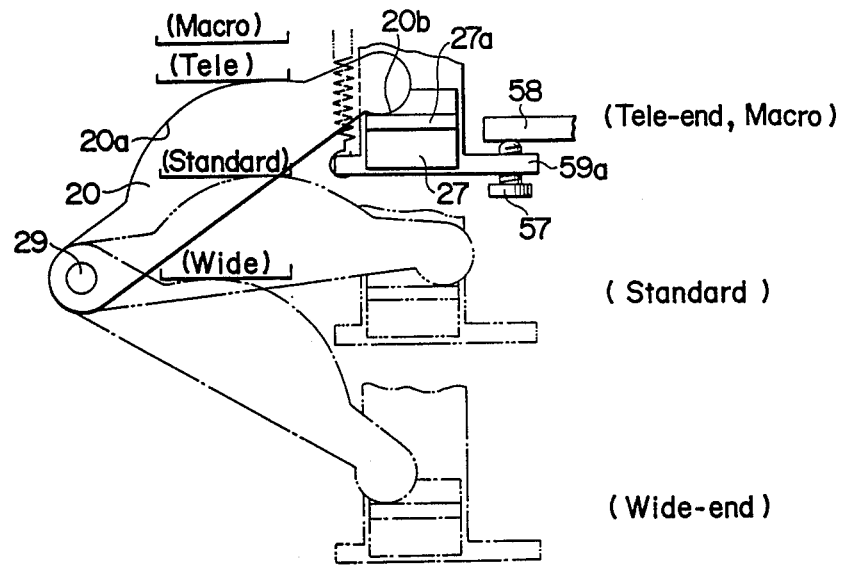
FIG. 19 is a plan view illustrating operations of a tele-macro mechanism shown in FIG. 18.

FIG. 18 shows an eighth embodiment of the present invention to realize a tele-macro optical system shown in FIG. 18, in which a lock member 58 is provided integrally with a stationary member not shown, such that the lock member 58 bears against a second lens holding frame 59 carrying the rear lens groups II when the latter reaches a tele-end to stop it. In addition, an adjusting screw 57 is provided on an abutting member 59a of the holding frame 59, such that a range at a macro photography can be adjusted by adjusting the screw 57. Other structures are similar to those of the seventh embodiment.

In the tele-macro mechanism described above, as shown in FIG. 19, since when an optical system reaches its tele-end position the screw 57 bears against the lock member 58, the rear lens group II stops at this position and thereafter enters a macro zone so that only the first lens holding frame 18 carrying the front lens group I moves along the optical axis to effect a tele-macro photography.

Figure 20:
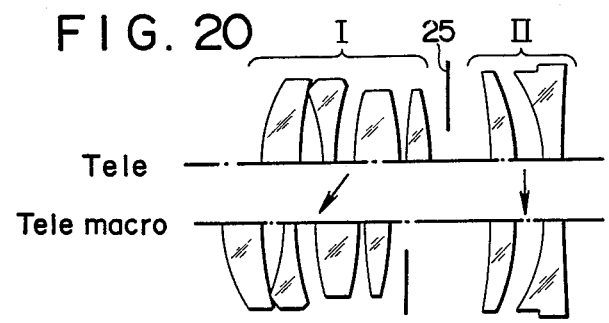
FIG. 20 is a diagram illustrating operations in a tele-macro mode of a zoom lens optical system composed of two lens groups.

FIG. 20 shows an example of movement of the optical system in the tele-macro optical system of the embodiment shown in FIG. 18.

As described above, the foregoing embodiments have the following advantages.

(1) The present invention is so constructed that lens holding frames for respective lens groups are mounted on a single guide shaft and a distance between lens groups is controlled by a cam arm. As a result, the present invention increases space and freedom of configuration and makes it to easily dispose a shutter and an AF drive mechanism, enabling both the size and simplicity of the structure to be minimized accordingly.

(2) Since means for adjusting inclination of an optical axis is provided on each of the lens groups and the guide shaft, it is possible to assure optical capabilities of lenses. Consequently, there is no need to be very precise in parts to thereby reduce costs.

(3) Since the abutting surface of the second lens holding frame with the cam arm is made to be rotatable around the abutting points at the tele-end and the wide-end, it is possible to easily adjust a distance between the front and the rear lens groups in a standard zone independently of the tele-and wide-ends.

(4) It is possible to easily add a macro mechanism.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A camera with a built-in zoom lens including at least first and second lens groups for effecting a zooming operation by moving the lens groups along their optical axis, comprising:
   a zoom frame which moves long the optical axis during the zooming operation;
   a first lens holding frame which moves integrally with said zoom frame during the zooming operation to allow said first lens group to move along the optical axis;
   a second lens holding frame for carrying said second lens group;
   a rocking arm having a first abutment which bears against said zoom frame and a second abutment which bears against said second lens holding frame and rockingly supported on a camera body; and
   means for urging said second lens holding frame through said rocking arm towards said zoom frame.

2. A camera with a built-in zoom lens according to claim 1, in which said zoom frame and said first lens holding frame are unified through a focusing cam member which is rotated when focusing and said first lens holding frame effects a focusing operation by allowing said first lens holding frame to move along the optical axis relative to said zoom frame with rotation of said focusing cam member.

3. A camera with a built-in zoom lens according to claim 1, in which at least one of said first and second abutments of said rocking arm comprises a cam.

4. A camera with a built-in zoom lens according to claim 3, in which
   an abutting position on said second lens holding frame with which a cam surface of said rocking arm abuts is located such that abutments at a long and a short focus end points are at the same position and an abutment position between the long and the short focus ends is made adjustable by rotating around said same position.

5. A camera with a built-in zoom camera according to claim 1, in which said first and second lens holding frames are slidably mounted on a single guide shaft provided in said zoom frame, along the optical axis.

6. A camera with a built-in zoom lens according to claim 5, in which means for adjusting inclinations of said first and second lens holding frames to said guide shaft are respectively provided between said guide shaft and said first and second lens holding frames.

7. A camera with a built-in zoom lens according to claim 1, further including lock means for locking said second lens holding frame during a macro operation.

8. A camera with a built-in zoom lens according to claim 7, in which said lock means comprises rocking arm lock means for indirectly locking said second lens holding frame by locking said rocking arm.

9. A camera with a built-in zoom lens according to claim 7, in which
   said lock means comprises second lens holding frame lock means for directly locking said second lens holding frame.

10. A camera with a built-in zoom lens according to claim 7, in which
    said locking means comprises switching means which operates during a macro operation and control means responsive to a signal from said switching means for rotating said focusing cam means to move said first lens holding frame to a close range side.

11. A camera with a built-in zoom lens comprising first and second lens groups for effecting the zooming operation by movement of said first and second lens groups in a direction along a common optical axis, comprising:
    a zoom frame movable along said optical axis during a zooming operation;
    a first lens holding frame for supporting said first lens group which is movable integrally with said zoom frame during a zooming operation for movement of said first lens group along said optical axis;
    a second frame for holding said second lens group;
    movable spacing means for adjustably controlling the axial distance between said first and second lens holding frames during a zooming operation.

12. A method for operating a camera having a built-in zoom lens comprised of first and second lens groups for affecting a zooming operation, said method comprising the steps of:
    moving said said first lens group to perform a zooming operation;
    moving the second lens group to maintain a predetermined adjustable axial spacing relative to the first lens group measured along said optical axis;
    said axial spacing being a function of the positioning of the said first lens group to obtain the desired zoom condition.

13. The method of claim 12 further comprising providing a zooming frame for enclosing the first lens group wherein said step of maintaining the displacement between first and second lens groups further comprises the steps of:
    positioning said second lens group relative to said zooming frame to maintain the appropriate spacing; and
    moving said first said lens group within said zooming frame to provide a fine focus adjustment.

14. A method according to claim 13 further comprising the step of locking the second lens group against the further movement when the second lens group reaches a predetermined location while permitting movement of the first lens group to affect a tele-macro photography operation.

15. A method according to claim 12 wherein said zoom lens comprises a third lens group and said method further comprises the step of adjustably maintaining the displacement distance measured along said optical axis between said second and third lens groups during a zooming operation.

16. A camera with a built-in zoom lens according to claim 1 further comprising:
    a third lens group;
    a third lens group holding frame; and
    second movable means for adjustably maintaining the displacement distance along said optical axis between second and third lens groups during a zooming operation.

* * * * *

UNITED STATES PATENT AND TRADEMARK OFFICE
CERTIFICATE OF CORRECTION

PATENT NO. : 4,764,784  
DATED : August 16, 1988  
INVENTOR(S) : Yuichi Torikoshi et al.

Page 1 of 2

It is certified that error appears in the above-identified patent and that said Letters Patent is hereby corrected as shown below:

ON THE TITLE PAGE  
IN THE ABSTRACT:

Line 15, before "lock" insert --a--.  
Line 15, "number" should be --member--.

Column 1, line 13, "771312" should be --77132--.  
Column 2, line 67, after "macro" insert --photography--.  
Column 3, line 30, "preent" should be --present--.  
Column 4, line 60, "is" should be --it--.  
Column 5, line 47, "disasembled" should be --disassembled--.  
Column 5, line 61, after "the" (first occurrence) delete "a".  
Column 5, line 61, "the" (second occurrence) should be --a--.  
Column 6, line 19, "for" should be --of--.  
Column 6, line 32, "can" should be --cam--.  
Column 7, line 50, "as" should be --are--.  
Column 9, line 20, "shaped" should be --shape--.

UNITED STATES PATENT AND TRADEMARK OFFICE
CERTIFICATE OF CORRECTION

PATENT NO. : 4,764,784

DATED : August 16, 1988

INVENTOR(S) : Yuichi Torikoshi et al.

It is certified that error appears in the above-identified patent and that said Letters Patent is hereby corrected as shown below:

IN THE CLAIMS:

Column 11, line 19, "long" should be --along--.
Column 12, line 8, "locking" should be --lock--.
Column 12, line 51, delete the last occurrence of "the".

Signed and Sealed this

Fifteenth Day of May, 1990

Attest:

HARRY F. MANBECK, JR.

*Attesting Officer*  *Commissioner of Patents and Trademarks*